United States Patent [19]

Schonfeld et al.

[11] Patent Number: 4,805,045

[45] Date of Patent: Feb. 14, 1989

[54] APPARATUS FOR LOADING AND UNLOADING A TAPE CARTRIDGE

[75] Inventors: Arnold Schonfeld, Norristown; Robert L. Lane, Broomall, both of Pa.

[73] Assignee: Laser Magnetic Storage International Company, Colorado Springs, Colo.

[21] Appl. No.: 170,632

[22] Filed: Mar. 15, 1988

Related U.S. Application Data

[63] Continuation of Ser. No. 842,449, Mar. 21, 1986, abandoned.

[51] Int. Cl.⁴ .................. G11B 15/04; G11B 15/08; G03B 1/04
[52] U.S. Cl. .................................. 360/60; 360/93; 242/195
[58] Field of Search ............... 360/60, 93, 95, 96.6; 242/195, 197, 198; 226/91, 92

[56] References Cited

U.S. PATENT DOCUMENTS

| | | | |
|---|---|---|---|
| 3,643,893 | 2/1972 | Neff | 242/195 |
| 3,659,804 | 5/1972 | Roman | 242/195 |
| 3,704,942 | 12/1972 | Tsunoda | 352/158 |
| 3,910,527 | 10/1975 | Buhler et al. | 242/186 |
| 3,949,423 | 4/1976 | Katada et al. | 360/96 |
| 3,951,357 | 4/1976 | Yamada et al. | 242/195 |
| 4,015,799 | 4/1977 | Koski et al. | 242/203 |
| 4,023,748 | 5/1977 | Burdorf et al. | 242/192 |
| 4,107,753 | 8/1978 | Izumikawa | 360/93 |
| 4,125,881 | 11/1978 | Eige et al. | 360/50 |
| 4,161,004 | 7/1979 | Dalziel | 360/106 |
| 4,196,873 | 4/1980 | Kudoh | 242/195 |
| 4,208,681 | 6/1980 | Hatchett | 360/93 |
| 4,227,224 | 10/1980 | Umezawa et al. | 360/96.5 |
| 4,256,996 | 3/1981 | Brooks et al. | 318/7 |
| 4,305,025 | 12/1981 | Arnold | 318/327 |
| 4,323,832 | 4/1982 | Okamura | 318/341 |
| 4,334,656 | 6/1982 | Crawford et al. | 242/195 |
| 4,335,858 | 6/1982 | Cranna | 242/195 |
| 4,370,683 | 1/1983 | Greig et al. | 360/73 |
| 4,377,829 | 3/1983 | Kamimura et al. | 360/96.5 |
| 4,383,660 | 5/1983 | Richard et al. | 242/197 |
| 4,389,600 | 6/1983 | Milligan et al. | 318/6 |
| 4,398,227 | 8/1983 | Anderson | 360/71 |
| 4,399,936 | 8/1983 | Rueger | 226/92 |
| 4,399,959 | 8/1983 | Godsoe et al. | 242/195 |
| 4,407,462 | 10/1983 | Tajima et al. | 242/184 |
| 4,426,047 | 1/1984 | Richard et al. | 242/197 |
| 4,432,508 | 2/1984 | Inoue et al. | 242/195 |
| 4,434,444 | 2/1984 | Sato | 360/96.5 |
| 4,441,129 | 4/1984 | Nakao | 360/96.5 |
| 4,447,838 | 5/1984 | Kato | 360/96.5 |
| 4,448,368 | 5/1984 | Skalko | 242/186 |
| 4,452,406 | 6/1984 | Richard | 242/195 |
| 4,467,379 | 8/1984 | Itani | 360/93 |
| 4,477,850 | 10/1984 | Ogata et al. | 360/94 |
| 4,477,851 | 10/1984 | Dalziel et al. | 360/95 |
| 4,500,965 | 2/1985 | Gray | 364/400 |
| 4,514,667 | 4/1985 | Sakmann et al. | 318/254 |
| 4,520,970 | 6/1985 | Rasmussen et al. | 242/195 |
| 4,532,563 | 7/1985 | Edakubo | 360/96.5 |
| 4,536,811 | 8/1985 | Kamimura et al. | 360/96.6 |
| 4,544,110 | 10/1985 | Nagel et al. | 242/67.1 R |
| 4,544,971 | 10/1985 | Komiya et al. | 360/96.5 |
| 4,555,077 | 11/1985 | Platter et al. | 242/198 |
| 4,564,875 | 1/1986 | Ihara | 360/96.6 |
| 4,608,614 | 8/1986 | Rinkleib et al. | 360/95 |
| 4,646,177 | 2/1987 | Sanford et al. | 360/95 |
| 4,704,645 | 11/1987 | Murphy et al. | 360/95 |

Primary Examiner—Vincent P. Canney
Attorney, Agent, or Firm—Weiser & Stapler

[57] ABSTRACT

An apparatus for loading and unloading a tape cartridge, particularly an IBM 3480 tape cartridge, has a loading rack for receiving the tape cartridge along one of its side edges, so that what is normally considered to be the rear edge of the tape cartridge is laterally received within the loading/unloading mechanism, and equipment for properly interacting with the tape cartridge in this modified orientation for engagement of the leader block of the tape cartridge so that the tape cartridge is then ready for loading into the transport apparatus and for detection of the condition of the tape cartridge within the apparatus.

45 Claims, 5 Drawing Sheets

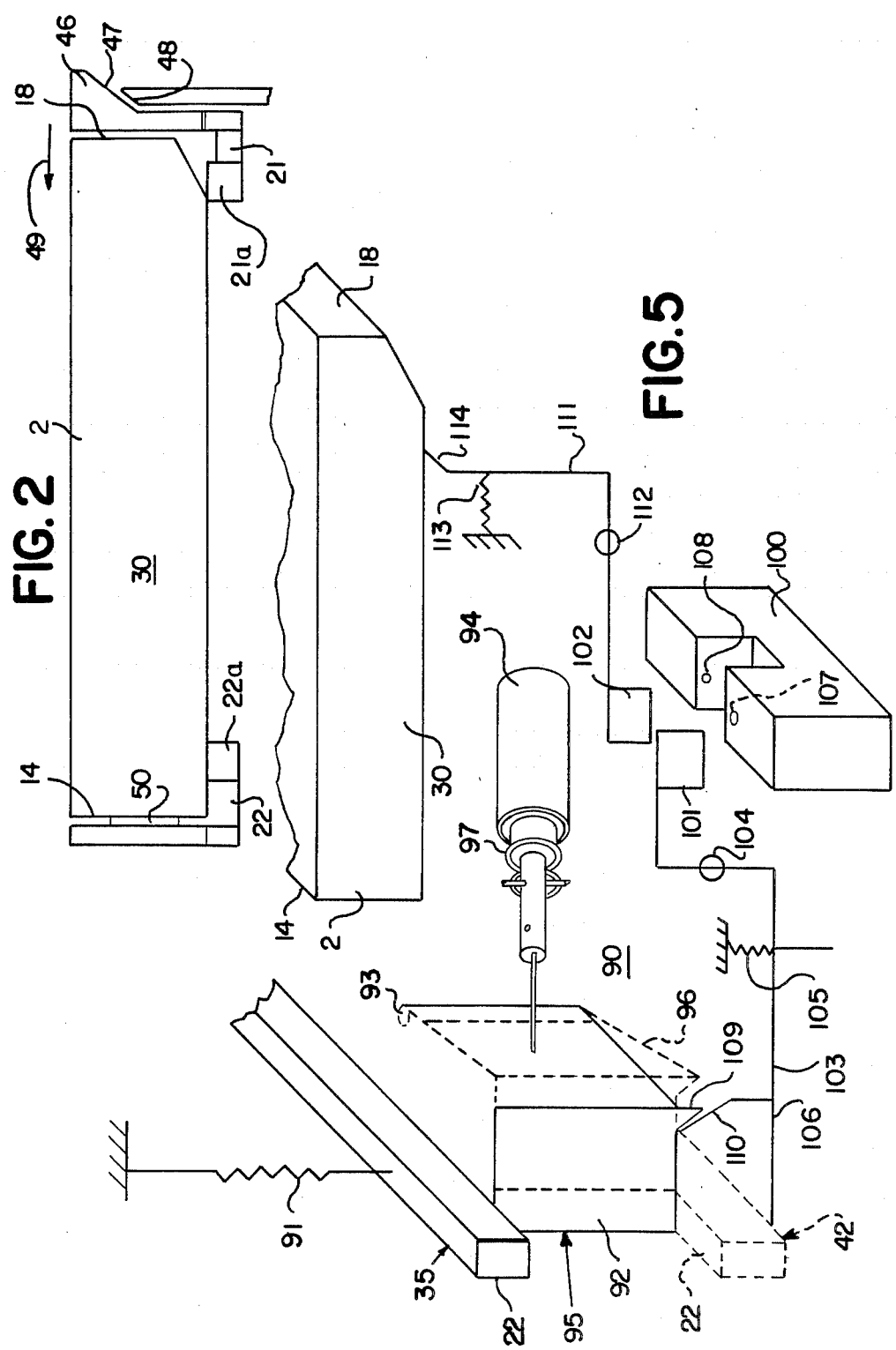

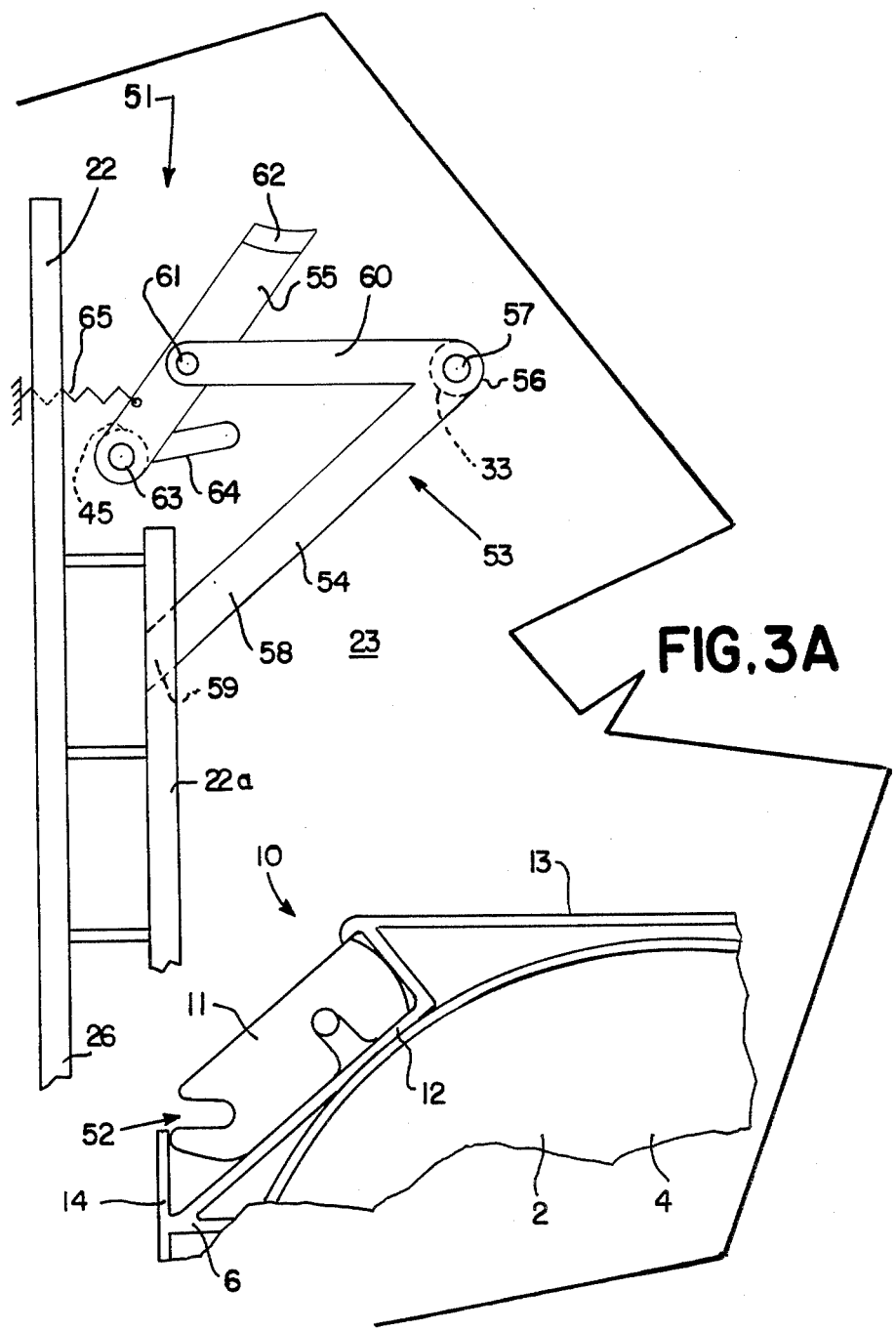

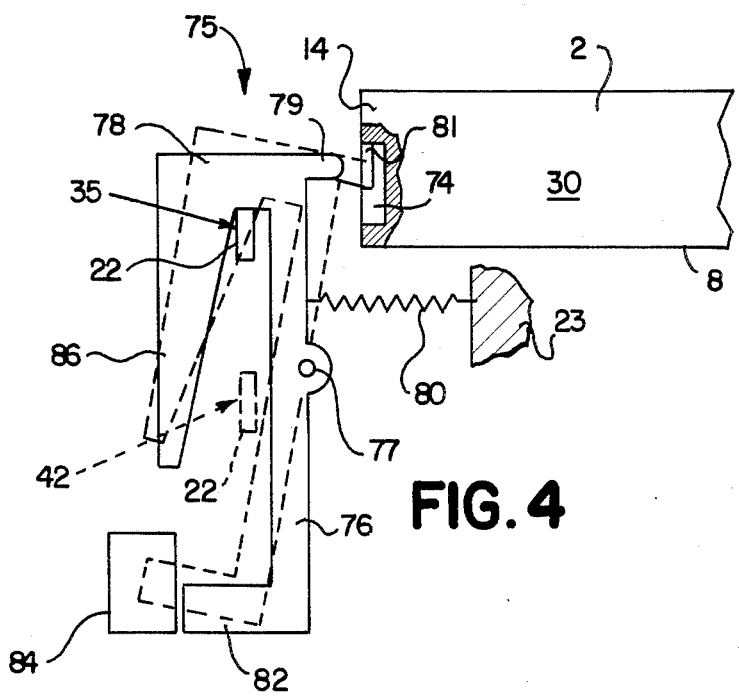
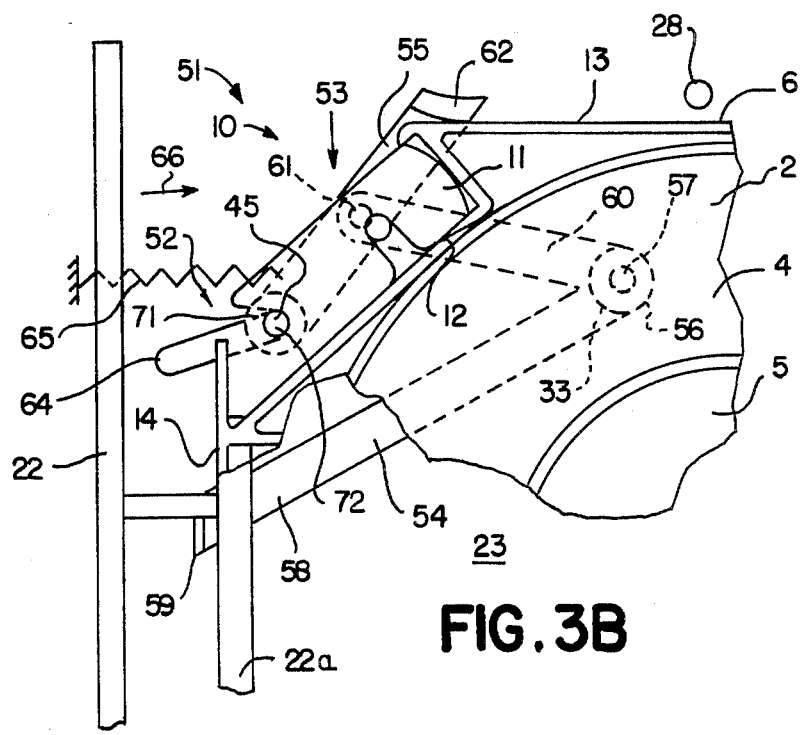

APPARATUS FOR LOADING AND UNLOADING A TAPE CARTRIDGE

This application is a continuation of application Ser. No. 842,449, filed Mar. 21, 1986 now abandoned.

BACKGROUND OF THE INVENTION

The present invention relates generally to the storage of data on magnetic recording tape, and in particular, to the storage of data on magnetic tape in cartridge form.

In the course of developing various systems for the storage of data on magnetic recording tape, particularly off-line storage of data in the form of back-up storage, a variety of different formats have been developed. Many of these formats call for the tape to be contained in an appropriate cartridge, both to facilitate handling of the tape while in use, and to protect the tape while in storage.

Recently, IBM Corporation has announced a tape cartridge which is primarily intended for use in its Model 3480 data storage system, for the storage of relatively large quantities of data (on the order of 200 megabytes). Details regarding the construction of this type of tape cartridge (hereinafter referred to as a 3480 tape cartridge) may be had with reference to U.S. Pat. No. 4,452,406. By way of general description, the 3480 tape cartridge is comprised of a single reel containing a quantity of magnetic tape and contained in a rectangular enclosure having dimensions on the order of 4 inches in width, 5 inches in length, and 1 inch in height. The cartridge enclosure includes an aperture in one of its major faces, to receive means for rotating the reel of tape contained within the cartridge, and an aperture in one of its corners, for gaining access to the free end of the web of tape. A so-called "leader block" is connected to the free end of the tape, and is frictionally received within the open corner of the cartridge so that it is capable of being withdrawn from and replaced within the cartridge by appropriate means.

In connection with the 3480 tape cartridge, IBM Corporation has also developed equipment for receiving the tape cartridge and for properly placing the web of tape which it contains in operative association with a magnetic read/write head. Further details regarding such equipment may be had with reference to U.S. Pat. Nos. 4,432,508; 4,399,959; 4,399,936; and 4,335,858, which illustrate various different devices which have been developed by the IBM Corporation to accommodate its 3480 tape cartridge.

Unlike many of the other types of tape cartridges which have been developed for use in the off-line storage of data, the IBM 3480 tape cartridge houses only a single reel of magnetic recording tape. The leader block which is connected to the free end of the web of tape is used to introduce the web of tape to the transport apparatus (and the read/write head). To this end, the transport apparatus must be provided with appropriate means for withdrawing the leader block from its nesting within the 3480 tape cartridge, and for threading the leader block (and the web of tape) through the apparatus and past the read/write head. Of course, means must also be provided for unthreading the web of tape (and the leader block) from the apparatus, and for replacing the leader block within its nesting in the 3480 tape cartridge. In connection with such operations, there are two major considerations which have particular pertinence to the present invention.

First, special means must be provided to engage the leader block assembly, and to guide the leader block (and the tape which follows) through the transport apparatus which is to operate upon the web of tape. This requires care in withdrawing the leader block from the tape cartridge, and in guiding the web of tape from the supply reel of the tape cartridge, past the read/write head, and into engagement with the take-up reel which is traditionally provided to cooperate with the supply reel in transporting the web of tape through the apparatus and past the read/write head. This necessitates the development of an appropriate path for threading the leader block through the apparatus, as well as means which have sufficient driving forces to withdraw the leader block from its normally seated position within the tape cartridge, and to replace the leader block within this normally seated position after the tape cartridge has been used. To meet these needs, as well as other design requirements regarding data density and performance characteristics, those devices described in the above-identified United States patents each make use of a loading mechanism which is essentially separate from the remainder of the apparatus which is used to operate upon the magnetic recording tape. In each case, a track or groove is provided for guiding the leader block through the desired tape path and to the take-up reel, under the influence of a dedicated driving means which is separate from the various components comprising the tape transport. Although several different mechanisms are described, in each case a separate motor and track/groove drive is provided to achieve proper interfacing of the web of tape with the apparatus.

Second, as with any magnetic tape recording apparatus, care must be taken to develop a proper tape path between the supply and take-up reels, and across the read/write head, to assure proper registration of the tape with the read/write head. The primary consideration in this regard is one of length, since the tape path must generally be long enough to accommodate distortion of the tape as the web of tape is drawn through the apparatus, as a result of mechanical irregularities in the apparatus. To this end, those devices described in the above-identified patents each provide a tape path of significant length, to account for such potential irregularities. A secondary consideration is that care must be taken to avoid undesirable contact between the oxide coating provided on the web of magnetic recording tape, and components of the apparatus other than the read/write head, such as bearings and idler rollers. When the IBM 3480 tape cartridge is used as intended in the various devices described in the above-identified patents, the oxide coating (formed on the inner most face of the tape on the supply reel) normally faces toward the interior of the transport apparatus due to its orientation. As a result of this placement, as the tape is threaded through the transport apparatus the potential exists for the oxide coating to be drawn across various of the guiding structures associated with the apparatus. Since contact with such structures can compromise the useful life of the tape cartridge, and give rise to a potential for memory loss in the event that portions of the oxide coating become damaged, special care is taken to avoid contact between the oxide coating and those guiding structures which the oxide coating could potentially contact. For example, air-bearings are provided on either side of the read/write head to avoid contact between the bearings and the web of tape which passes across them.

As a result of these and other design considerations, those devices which have been developed to operate upon IBM 3480 tape cartridges have generally been large, cumbersome and expensive. While this can be justified in connection with relatively large, mainframe applications, such design constraints have significantly limited, if not totally precluded use of the 3480 tape cartridge in connection with relatively low cost, minicomputer or microcomputer applications.

Yet another consideration which has inhibited use of the 3480 tape cartridge in mini/micro-computer applications is one of space. It is generally impractical, and therefore undesirable, to necessitate the purchase of an apparatus for off-line, back-up storage or the like which is significantly larger than the primary equipment which the apparatus is to support. In fact, due to the prevalent use of 5¼ inch magnetic recording (floppy) discs in connection with such applications, a de facto standard has come about for any form of storage equipment (floppy disc, hard disc, cartridge, etc.) which is to replace or relate to such conventional storage means. The recognized "form factor" or "footprint" of a standard 5¼ inch magnetic recording disc calls for a container or housing having dimensions on the order of 5¾ inches in width, 8 inches in depth and 3¼ inches in height. Those devices described in the above-identified patents are not adaptable to such applications.

Accordingly, limitations of cost and size have significantly limited the ability to use the IBM 3480 tape cartridge in mini/micro-computer applications. For this reason, efforts have been made to develop other means for adapting 3480 tape cartridges to the 5¼ inch form factor which is desired for such applications. One such system is described with reference to U.S. patent application Ser. Nos. 842,446, now U.S. Pat. No. 4,769,797, and 842,450, entitled "Apparatus for Loading and Unloading the Leader Block of a Tape Cartridge" (Jay Smith); 842,487, entitled "Apparatus for Coupling a Drive Motor to a Leader Block Loading/Unloading Mechanism" (Jay Smith); and 842,448 entitled "Retractable Tape Guide" (Daniel Sachuk), which have been co-filed with the present application, and which are commonly owned by Computer Peripherals, Inc.

Briefly, these patent applications describe a system for engaging the leader block of a 3480 tape cartridge and for guiding the leader block through the transport apparatus using a threading mechanism which is directly associated with the take-up reel of the apparatus, rather than requiring the use of an independent loading mechanism. To accomplish such loading of the leader block in an apparatus where space requirements are to be kept to a minimum, without unacceptably compromising the tape path, and while avoiding contact between the oxide layer on the web of tape and structures other than the read/write head, it has surprisingly been found to be desirable to receive the tape cartridge within the apparatus in an orientation which is rotated 90 degrees from its normally intended orientation. As a consequence of this placement, the oxide coating is oriented so as to avoid contact with guiding structures such as bearings and idler rollers, and the tape path for the web of tape is significantly extended from that which would result from conventional placement of the 3480 tape cartridge within the transport apparatus.

Although such placement of the tape cartridge has enabled the development of an apparatus which can accommodate a 3480 tape cartridge within the 5¼ inch form factor of a conventional disc-type storage apparatus, rotation of the tape cartridge through an angle of 90 degrees has caused certain difficulties. For example, because of this rotation, the slot which is provided in the leader block for engagement by the threading mechanism no longer extends rearwardly from the tape cartridge, but rather extends transversely from a side edge, making engagement of the slot more difficult. Moreover, various ancillary features such as the means which are traditionally provided to prevent data from being recorded over existing data to be retained (so-called write protection) are no longer in their expected location. It therefore became necessary to develop a means for receiving the 3480 tape cartridge, for loading and unloading, in an orientation which is rotated 90 degrees from the normally intended placement of the tape cartridge, without compromising the performance features of the tape cartridge.

SUMMARY OF THE INVENTION

It is therefore a primary object of the present invention to provide a means for receiving an IBM 3480 tape cartridge for loading and unloading of the magnetic recording tape which it contains, in an orientation which differs from its normally intended placement.

It is also an object of the present invention to provide such an apparatus wherein the means used to receive the tape cartridge, and to operate upon the tape cartridge for loading and unloading, are sufficiently compact to fit within a standard 5¼ inch footprint or form factor.

It is also an object of the present invention to provide such an apparatus wherein the tape cartridge is received within the apparatus without compromising or inhibiting any of its operative features.

It is also an object of the present invention to provide such an apparatus wherein sufficient safeguards are provided to avoid improper operation of the apparatus, or damage to the tape cartridge.

It is also an object of the present invention to provide such an apparatus wherein the complexity and cost of the resulting apparatus are in line with mini/micro-computer operations.

These and other objects are achieved according to the present invention by providing an apparatus for loading and unloading a tape cartridge, particularly an IBM 3480 tape cartridge, which generally comprises means for receiving the tape cartridge along one of its side edges, so that what is normally considered to be the rear edge of the tape cartridge is laterally received within the loading/unloading mechanism, while providing suitable means for properly interacting with the tape cartridge in this modified orientation. To this end, means are provided for receiving the tape cartridge along one of its side edges, and for urging the tape cartridge into a standby position. From this standby position, the cartridge is then capable of being lowered into engagement with the drive mechanism which is to operate the supply reel of the tape cartridge. In the course of these operations, a pin is caused to engage the leader block of the tape cartridge so that the tape cartridge is then ready for loading into the transport apparatus.

Special features provided in connection with such a loading/unloading mechanism include a sensor for detecting the condition of the write-protect device associated with the tape cartridge, sensors for monitoring the condition of the tape cartridge within the apparatus, and means for assisting in loading and unloading of the tape cartridge in a simplified, yet fail-safe fashion.

For further detail regarding a loading/unloading mechanism in accordance with the present invention, reference is made to the following detailed description taken in conjunction with the following illustrations.

BRIEF DESCRIPTION OF THE DRAWINGS

FIG. 2 is a partial, elevational view showing the means used to urge the tape cartridge into its seated position.

FIGS. 3A and 3B are top plan views of the means used to engage the slot in the leader block of a seated tape cartridge.

FIG. 4 is a side elevational view of the means used to determine the condition of the write-protect device associated with the tape cartridge.

FIG. 5 is a schematic view of the means used to interface the tape cartridge with the loading/unloading mechanism so as to regulate loading and unloading of the tape cartridge in accordance with the operating mode of the apparatus, to avoid damage to the tape cartridge.

In the several views provided, like reference numerals denote similar structure.

DETAILED DESCRIPTION OF A PREFERRED EMBODIMENT

Figure 1:
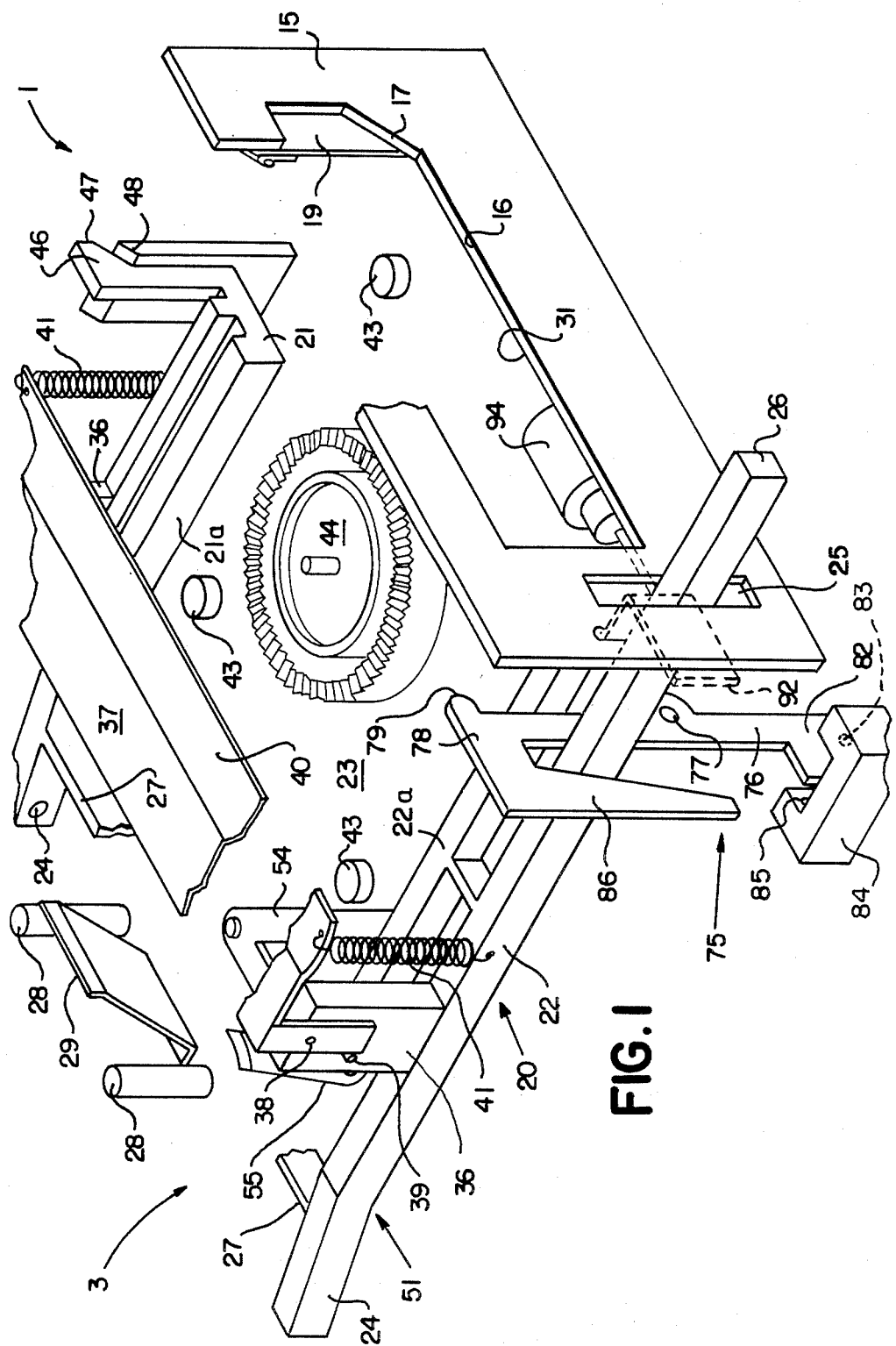
FIG. 1 is a fragmented, perspective view of a preferred embodiment tape cartridge loading/unloading mechanism in accordance with the present invention.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 generally illustrates a preferred embodiment loading/unloading mechanism 1 in accordance with the present invention. As previously discussed, the loading/unloading mechanism 1 is specially suited to receive an IBM 3480 tape cartridge 2 within a transport apparatus 3 which is capable of being located within the confines of a standard 5¼ inch form factor or footprint.

The tape cartridge 2 (See FIGS. 3A and 3B) generally comprises a quantity of magnetic recording tape 4 wound upon a supply reel 5 and contained within a housing 6. An aperture 7 in the lower most face 8 of the housing 6 (see FIGS. 6 & 7) enables communication with a coupling 9 (preferably a geared, magnetic coupling) for operating (rotating) the supply reel 5 as will be described more fully below. A corner 10 of the housing 6 (see FIGS. 6 & 7) is open, and receives a leader block 11, which is used to securely engage the free end 12 of the web of tape 4.

In accordance with the present invention, the tape cartridge 2 is to be received within the loading/unloading mechanism 1 along a side edge 13, so that the edge 14 of the tape cartridge 2 which is normally considered to be its rear edge is positioned laterally, along the left side of the transport apparatus 3 as viewed from the front of the loading/unloading mechanism 1.

To receive the tape cartridge 2 in this orientation, the face of the loading/unloading mechanism 1 takes the form of a bezel 15 having an opening 16, the periphery of which is correspondingly configured to the longitudinal cross-section of the tape cartridge 2, as it is to be inserted into the loading/unloading mechanism 1. Thus, for example, the bezel 15 is provided with a chamfer at 17, to receive the narrowed front face 18 of the tape cartridge 2 and prevent reversed (180°) insertion of the tape cartridge 2. Preferably, although not necessarily, the opening 16 is enclosed by a hinged door 19 (See FIGS. 6 and 7).

Upon its insertion through the opening 16 in the bezel 15, the tape cartridge 2 is received upon a loading rack 20. The loading rack 20 generally comprises a pair of rails 21, 22 which are pivotally associated with the bed 23 of the transport apparatus 3 at the pivots 24. The right most rail 21 extends from its pivot 24 to a position short of the bezel 15. The left most rail 22 extends from its pivot 24, fully through a slot 25 provided in the bezel 15, so that the end 26 of the left rail 22 can serve as an actuator handle as will be described more fully below. The rails 21, 22 are connected together by at least one cross-support 27 so as to strengthen the loading rack 20, and to cause parallel movement of the rails 21, 22 responsive to movement of the handle 26.

Also associated with the bed 23 of the transport apparatus 3 are a pair of stops 28 and a spring 29. The stops 28 are spaced from the bezel 15 by a distance which slightly exceeds the width of the tape cartridge 2. As a result, upon insertion of the tape cartridge 2 through the opening 16 of the bezel 15, the lateral edges 13, 30 of the tape cartridge 2 are nested in position between the stops 28 and the inside lower lip 31 of the opening 16 of the bezel 15, so that the lower face 8 rests upon extensions 21a, 22a of the rails 21, 22 and the interconnecting cross-support 27. The spring 29 serves to bias the tape cartridge 2 against the inside lower lip 31 of the bezel 15, or other stops coming from the transport bed 23 and located just inside the bezel 15, if provided. This longitudinally seats the tape cartridge 2 in what is essentially a standby position 35 in the loading/unloading mechanism 1 (See FIG. 6), which readies the tape cartridge 2 for subsequent loading as will be described more fully below.

Each of the rails 21, 22 are provided with a support 36 for receiving a spring loaded arm 37 at the pivots 38. The forward most edge 40 of the arm 37 is provided with a leaf shaped extension, which is operatively connected to the rails 21, 22 by a pair of springs 41. As a result of interaction between the spring loaded arm 37 and a pair of stops 39 on the supports 36, the leaf-shaped extension 40 of the spring loaded arm 37 is normally spaced from the cartridge receiving surfaces 21a, 22a of the rails 21, 22 by a distance which is slightly more than the height of the tape cartridge 2. This is done to avoid possible interference with the tape cartridge 2 as it is inserted through (or ejected from) the opening 16 of the bezel 15, and onto the loading rack 2.

Figure 7:
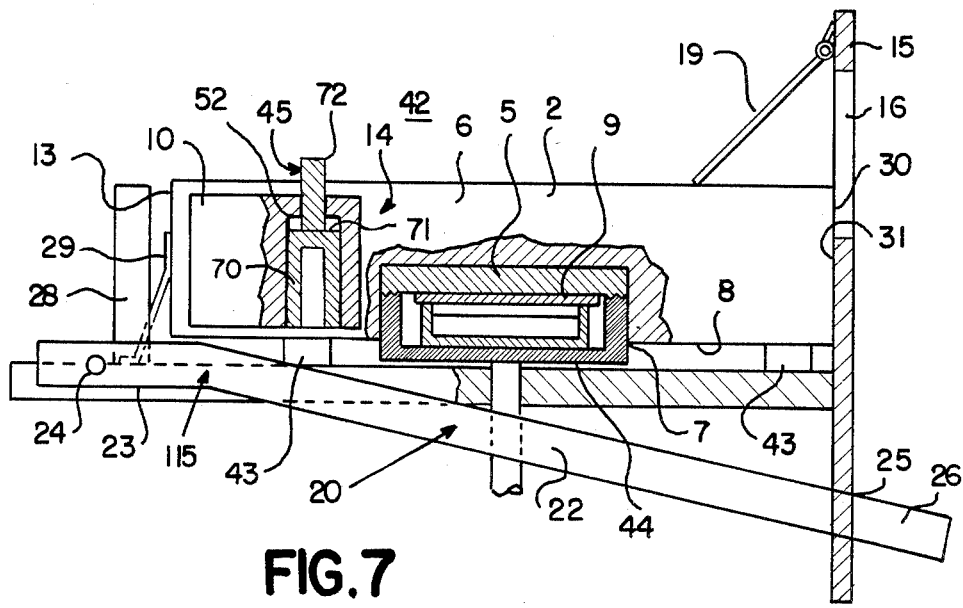
FIG. 7 is a partially sectioned, elevational view similar to FIG. 6, showing the tape cartridge in an operative position.

From this standby position 35, the tape cartridge 2 is then capable of being lowered to an operative position 42 by means of the handle 26 (See FIG. 7). Lowering the handle 26 causes the leaf-shaped extension 40 of the spring loaded arm 37 to contact the upper face of the tape cartridge 2, which in turn causes the tape cartridge 2 to be pulled downwardly under the influence of the spring loaded arm 37 so that the lower face 8 of the tape cartridge 2 comes to rest upon a series of pedestals 43, and so that the coupling 9 of the supply reel 5 of the tape cartridge 2 is received upon the corresponding coupling 44 of a supply motor positioned beneath the bed 23 of the transport apparatus 3.

In the operative position 42, the pedestals 43 (preferably located on the bed 23 in a three-point pattern) serve to place the tape cartridge 2 at the proper height with respect to the bed 23 of the transport apparatus 3 so as to bring the coupling 9 of the supply reel 5 into proper engagement with the coupling 44, and so as to place a configured guide pin 45 in proper registration with the leader block 11 of the tape cartridge 2 as will be described more fully below. As previously indicated, the spring 29 serves to longitudinally orient the tape cartridge 2 within the loading/unloading mechanism 1. Proper transverse positioning of the tape cartridge 2 within the loading/unloading mechanism 1 is achieved by providing the right rail 21 of the loading rack 20 with one or more wedges 46 which extend upwardly from the right rail 21 and along the front face 18 of the tape cartridge 2, as shown in FIG. 2.

Each wedge 46 is provided with an inclined surface 47 which is configured to cooperate with the corresponding incline of a spring 48 which extends upwardly from the bed 23 of the transport apparatus 3. Consequently, as the tape cartridge 2 is lowered to the operative position 42, the inclined surface 47 is brought into contact with the inclined surface 48, so that further downward progression of the wedge 46 urges the wedge 46 against the front face 18 of the tape cartridge 2, in turn urging the tape cartridge 2 in the direction of the arrow 49 and into an alignment stop 50.

As a result of such alignment, the tape cartridge 2 becomes seated (in the operative position 42) for proper mating with the coupling 44, and for proper interaction with the remainder of the loading/unloading mechanism 1 as will be describe more fully below.

In receiving the tape cartridge 2 within the loading-/unloading mechanism 1 as previously described, a number of considerations present themselves in assuring that the aligned tape cartridge 2 is ready to be operated upon by the transport apparatus 3. The loading/unloading mechanism 1 therefore includes a number of devices which assure proper interaction between a properly seated tape cartridge 2 and the remainder of the transport apparatus 3 as follows.

For example, a properly seated tape cartridge 2 will be received within the loading mechanism 1 such that the leader block 11 of the tape cartridge 2 is positioned at the rear, left corner 51 of the loading rack 20 rather then the normally expected rear, right corner, since the rear edge 14 of the tape cartridge 2 is now located laterally along the loading rack 20, rather than adjacent to the stops 28 (its traditional positioning). As a consequence of this, the slot 52 which is conventionally provided in the leader block 11, to enable engagment of the leader block 11 by the guide pin 45 as will be described more fully below, will extend laterally from the tape cartridge 2, rather than longitudinally toward the rear of the transport apparatus 3. It therefore becomes necessary to take special measures to properly engage the slot 52, due to this special positioning. FIGS. 3A and 3B illustrates a pin locating mechanism 53 which is useful in providing this function.

The pin locating mechanism 53 generally comprises a pair of arms 54, 55 placed in operative association with one another as follows. The arm 54 is essentially V-shaped, with its apex 56 attached to the bed 23 of the transport apparatus 3 at the pivot 57. A first leg 58 of the arm 54 terminates in an upwardly extending protrusion 59 which is in general alignment with the extension 22a of the left rail 22, while the second leg 60 of the arm 54 terminates at a pivot 61 for receiving the second of the arms 55. The arm 55 is provided with an upwardly extending shoulder 62 at one end, and a pin 63 configured for cooperative engagment within a slot 64 in the bed 23 of the transport apparatus 3 at its other end.

A spring 65 serves to normally bias the pin locating mechanism 53 to the position shown in FIG. 3A. In this position, the pin 63 of the pin locating mechanism 53 is located just inboard of the loading rack 20, while the protrusion 59 is located in general alignment with the extension 22a of the left rail 22. As a result, the pin 63 is placed in proper position for the acceptance of a tape cartridge 2 within the loading/unloading mechanism 1, while the protrusion 59 serves to support the initially empty loading rack 20 in the standby position 35, and to prevent lowering of the loading rack 20 without having first placed a tape cartridge 2 within the loading/unloading mechanism 1.

With reference to FIG. 3B, it will be seen that as a tape cartridge 2 is inserted onto the loading rack 20, the side edge 13 of the tape cartridge 2 is caused to contact the shoulder 62 of the arm 55, urging the arm 55 in the general direction of the arrow 66. This serves to draw the pin 63 inwardly toward the leader block 11 as the tape cartridge 2 comes to be seated in its standby position at 35, and to draw the protrusion 59 out from beneath the extension 22a of the left rail 22, freeing the loading rack 20 for movement to the operative position 42 upon downward movement of the handle 26. The shoulder 62 is preferably curved to facilitate movement of the arm 55 across the edge 13 of the tape cartridge 2 in the course of these operations.

The pin 63 of the arm 55 is configured to receive the guide pin 45 which is ultimately used to engage the slot 52 of the leader block 11, for loading and unloading. The guide pin 45 has a broadened base 70 which narrows at a shoulder 71 and terminates at a narrowed guide 72, which features are configured to engage the correspondingly configured slot 52 which the manufacturer conventionally provides in the leader block 11 of the tape cartridge 2. As the tape cartridge 2 becomes seated in the standby position 35, the narrowed guide 72 enters the slot 52 of the leader block 11 as a consequence of movement of the pin 63 as previously described. As the tape cartridge 2 is lowered to its operative position 42, the features of the guide pin 45 come to be seated within the corresponding features of the slot 52 of the leader block 11, and the pin locating mechanism 53 is forced downwardly under the influence of the tape cartridge 2, and ultimately the loading rack 20, against the forces exerted by a coil spring 33 associated with the pivot 57. As a consequence of this, the pin 63 is lowered from the guide pin 45 to ready the leader block 11 for withdrawal from the tape cartridge 2. When it is desired to remove the tape cartridge 2 from the loading/unloading mechanism 1, the foregoing steps are reversed, returning the guide pin 45 to the pin 63, freeing the guide pin 45 from the slot 52 of the leader block 11, and returning the various components of the pin locating mechanism 53 to their original position under the influence of the spring 65 as the tape cartridge 2 is removed from the loading rack 20.

Another consideration is that in connection with the operation of tape cartridges, it is often the case that information already contained on the tape cartridge is not to be disturbed, and is therefore not to be recorded over. For this reason the tape cartridge 2 is conventionally provided with a write-protect tab 74 which is capable of being selectively re-oriented in the event that further data recording is not to take place, to protect the contents of the tape. It is therefore important for the loading/unloading mechanism 1 to provide a means for detecting whether or not the write-protect tab 74 has been re-oriented in the tape cartridge 2 so as to inhibit the writing of information on the web of tape 4, and prevent a corresponding loss of data. To this end, the write-protect means 75 shown in FIG. 4 is provided.

The write-protect means 75 generally comprises a lever 76 which is connected to the support bed 23 of the transport apparatus 3 at a pivot 77. A first end 78 of the lever 76 is provided with a protrusion 79 which is normally biased toward the tape cartridge 2 by a spring 80, and which is sized and generally oriented the write-protect tab 74, if oriented so as not to prevent the writing of data or to enter the cavity 81 which is developed if the write-protect tab 74 is oriented to prevent the writing of data. The other end of the lever 76 is provided with a flag 82 which is capable of interrupting a beam of light projected from the source 83 of an optical interrupter 84, to its corresponding sensor 85. The flag 82 and optical interrupter 84 are positioned so that extension of the protrusion 79 of the lever 76 determines whether or not light from the source 83 will reach the sensor 85. This provides a signal which can be used to electronically enable or disable the writing of data in accordance with the condition of the write-protect tab 74 on the tape cartridge 2. Preferably, the writing of data is disabled in the absence of light on the sensor 85, so that the contents of the tape cartridge 2 will be protected even in the event of a failure of the optical interrupter 84 (or its associated systems).

Ordinarily, the spring 80 will bias the protrusion 79 of the lever 76 fully to the right, which could hamper insertion of the tape cartridge 2 into the loading/unloading mechanism 1. For this reason, the end 78 of the lever 76 is additionally provided with an inclined latch 86 which is cantilevered outwardly from the lever 76, extending over the left rail 22. As a result, when the left rail 22 is in its raised position, so as to receive a tape cartridge 2, the left rail 22 engages the incline of the latch 86 so as to draw the protrusion 79 to the left, clearing the path for the tape cartridge 2. However, after the tape cartridge 2 has been received in the standby position 35, and the handle 26 is lowered to the operative position 42, the left rail 22 is drawn away from the incline of the latch 86, freeing the protrusion 79 for operation as previously described. In unloading the tape cartridge 2, the latch 86 again serves to draw the protrusion 79 away from the tape cartridge 2 as the tape cartridge 2 is raised to the standby position 35.

Yet another consideration is that to avoid damage to the tape cartridge 2, and the subsequent loss of data, as well as to avoid damage to the various components of the loading mechanism 1, it is important to make sure that the tape cartridge 2 can only be operated upon (loaded, tape transported, unloaded, etc.) when the conditions are safe for such operations to take place. For this reason, the loading/unloading mechanism 1 is provided with a number of fail-safe features. For example, in addition to holding an empty loading rack 20 in the standby position 35, the protrusion 59 of the pin locating mechanism 53 serves to prevent lowering of the handle 26 until such time as a tape cartridge 2 has been loaded into the mechanism 1, and has been correctly seated on the loading rack 20. The write-protect means 75 serves to prevent the loss of data to be retained. Yet another safety feature resides in an interlocking system 90, which serves to prevent improper operation of the loading/unloading mechanism 1 through its various cycles, as follows.

As previously indicated, the left rail 22 is capable of being moved between a standby position 35 and an operative position 42 by means of the handle 26. With reference to FIG. 5, a spring 91 is preferably provided to normally bias the left rail 22, and therefore the loading rack 20, to the standby position 35 so that the tape cartridge 2 is normally seated just within the opening 16 of the bezel 15. A spring latch or a series of mechanical detents could also be provided to serve this function, if desired. In any event, as previously described, with the tape cartridge 2 properly seated in its standby position 35, the protrusion 59 of the pin locating mechanism 53 is withdrawn from beneath the extension 22a of the left rail 22, so that the loading rack 20 can be lowered to the operative position 42, along with the tape cartridge 2. Such movement is additionally regulated by the interlocking system 90, as follows.

A gate 92 is provided which is pivoted for rotation at 93 in accordance with operation of a solenoid 94, between a first operative position 95 which is in general alignment with the left rail 22, and a second operative position 96 (shown in phantom) which is not. The height of the gate 92 is approximately equal to the distance between the bottom of the left rail 22 when in the standby position 35 and the top of the left rail 22 when in the operative position 42. The solenoid 94 is normally biased to its extended position, under the influence of a spring 97, so that the gate 92 is normally biased to the operative position 95 in alignment with the left rail 22.

As a consequence of this, the loading rack 20 and the tape cartridge 2 cannot be lowered to the operative position 42 until the solenoid 94 has been activated. Thus, when the transport apparatus 3 is switched off, or in the event of a power failure, the left rail 22 cannot be lowered from the standby position 35. To be noted is that this also prevents the left rail 22 from being raised from the operative position 42 under similar circumstances (power off, power failure, etc.). This serves to prevent attempts to remove the tape cartridge 2 from the loading/unloading mechanism 1 (when inoperative) to avoid damage to the tape cartridge 2, particularly in the event that the web of tape 4 and the leader block 11 have not yet been returned to the tape cartridge 2.

The solenoid 94 also receives operative signals from an optical interrupter 100, in association with a pair of flags 101, 102. A first flag 101 is mounted at the end of a lever 103 which is adapted to pivot at 104 under the influence of a spring 105. The opposite end 106 of the lever 103 is positioned beneath the left rail 22 so that when the left rail 22 is moved to the operative position 42, the left rail 22 pushes down on the end 106 of the lever 103 so that the flag 101 is pivoted upwardly, and away from between the source 107 and sensor 108 of the optical interrupter 100. The end 106 of the lever 103 is additionally provided with an inclined projection 109, which cooperates with a corresponding incline 110 associated with the gate 92 to similarly draw the flag 101 away from between the source 107 and sensor 108 of the optical interrupter 100 when the gate 92 is in the operative position 95, overlying the left rail 22 as previously described.

A second flag 102 is mounted at the end of yet another lever 111, which is adapted to pivot at 112 under the influence of a spring 113. The opposite end 114 of the lever 111 is positioned beneath the loading rack 20 so that when a tape cartridge 2 is properly received and seated in the operative position 42, the end 114 of the lever 111 is depressed so that the flag 102 is withdrawn from between the source 107 and sensor 108 of the optical interrupter 100.

In operation, a tape cartridge 2 is first located on the loading rack 20, then in the standby position 35. When operation is desired, and upon applying power to the transport mechanism 3, gate 92 is retracted under the influence of the solenoid 94, enabling the left rail 22 to be lowered to the operative position 42. As the tape cartridge 2 assumes the operative position 42, both of the flags 101, 102 are withdrawn from between the source 107 and sensor 108 of the optical interrupter 100, generating an electrical signal. This signal is then used (e.g. in a switching circuit or a microprocessor) to interrupt power to the solenoid 94, which causes the gate 92 to assume a position over the left rail 22. This prevents the left rail 22 from being raised from the operative position to the standby position until a desired unloading operation takes place, which serves to prevent removal of the tape cartridge 2 from the loading/unloading mechanism 1 during powered operation of the transport apparatus 3, as well as during unpowered failures as previously described. Interaction between the inclines 109, 110 serves to maintain such conditions, even if the left rail 22 is accidentally jostled to an extent which would permit the flag 101 to re-enter the optical interrupter 100, erroneously signaling for retraction of the gate 92 and releasing the tape cartridge 2 under the influence of the spring 97.

It is not until after the leader block 11 has been returned to the tape cartridge 2, that a suitable signal is generated (e.g., in a switching circuit or a microprocessor) to again activate the solenoid 94, and withdraw the gate 92 from its position over the left rail 22, to permit the spring 97 (or an operator) to raise the loading rack 20 to the standby position 35. Whether or not the tape cartridge 2 is returned to the standby position 35, or is raised beyond the inside lower lip 31 of the opening 16 in the bezel 15, for discharge from the loading/unloading mechanism 1, depends upon the forces which are applied to the loading rack 20 by the spring 97, or the operator's positioning of the handle 26. By using a relatively weak spring, or an appropriately configured detent, the tape cartridge 2 can be returned to a standby position in engagement with the inside lower lip 31 of the bezel 15. Using a stronger spring would result in ejection of the tape cartridge 2 from the loading/unloading mechanism 1, with the assistance of the spring 29. In the former case, the gate 92 (upon deactivation of the solenoid 94) will be brought into contact with the side of the left rail 22 until such time as the handle 26 is fully raised to release the tape cartridge 2 from the apparatus. In the latter case, the gate 92 will immediately assume a position beneath the left rail 22, preventing further operation of the transport apparatus 3 until such time as appropriate operating conditions are met.

In loading a tape cartridge 2 into the loading/unloading mechanism 1, steps should be taken, where possible, to assure that the tape cartridge 2 is installed in its proper orientation, rather than enabling an operator to accidentally install the tape cartridge 2 in some other orientation. This is particularly important in view of the fact that the present invention addresses the insertion of a tape cartridge 2 into the loading/unloading mechanism 1 in an orientation which is rotated essentially 90 degrees from the normally expected positioning of the tape cartridge 2. For this reason, means are provided to assure that the tape cartridge 2 is received within the loading/unloading mechanism 1 in the proper orientation. For example, the chamfer 17 in the bezel 15 is configured to receive the tape cartridge 2 along its side edge 13 rather than its rear edge 14. Moreover, since the depth of the tape cartridge 2 is greater than its width, only proper orientation of the tape cartridge 2 within the loading/unloading mechanism 1 will enable the tape cartridge 2 to fit between the stops 28 and the inside lower lip 31 of the bezel 15, while attempts at longitudinal insertion of the tape cartridge 2 will be inhibited by the stops 28.

Figure 6:
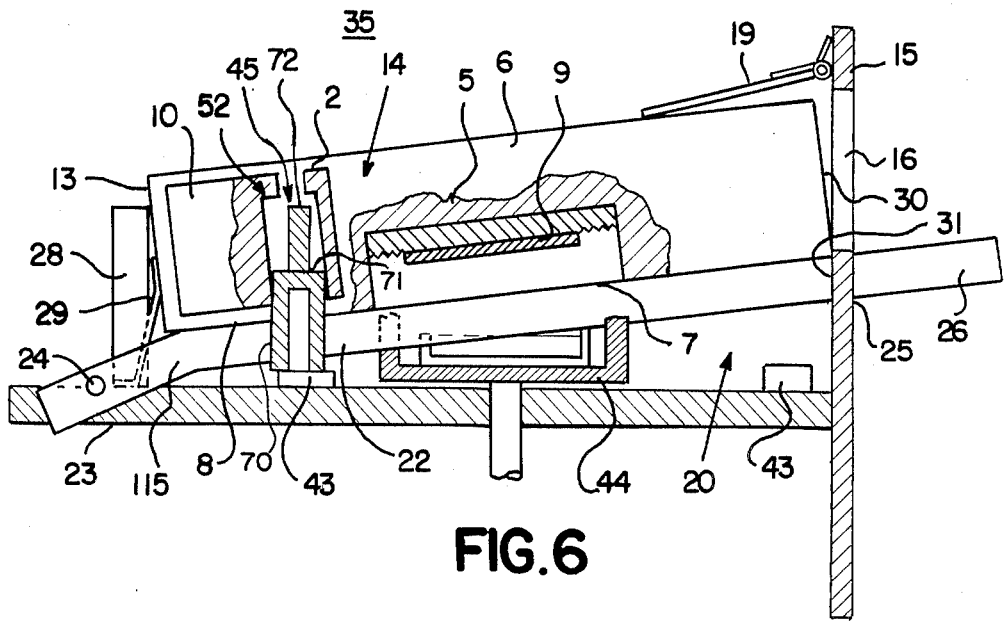
FIG. 6 is a partially sectioned, elevational view of the loading/unloading mechanism of FIG. 1, showing the tape cartridge placed within the loading/unloading mechanism in a standby position.

Steps should also be taken, where possible, to facilitate unloading of the tape cartridge 2. As previously described, the tape cartridge 2 to which the present invention relates is operated by means of geared, magnetic couplings 9, 44 which establish an operative connection with the supply reel 5 of the tape cartridge 2 when the tape cartridge 2 is moved to the operative position 42. To assure positive driving of the supply reel 5, this magnet will generally exert a force of attraction on the order of 15 to 16 pounds. This represents a substantial loading which can make movement of the handle 26 from the operative position to the standby position quite difficult. To minimize this difficulty, each of the rails 21, 22 are preferably configured as is best illustrated in FIGS. 6 and 7, with a bend at 115. By positioning the bend 115 close to the pivots 24, preferably near the edge 13 of the tape cartridge 2, and away from the handle 26, a mechanical advantage is developed which assists in lifting the tape cartridge 2 from the coupling 44 during unloading of the tape cartridge 2. In addition to this mechanical advantage, the bend 115 serves to in essence "peal away" the tape cartridge 2 from the coupling 44, further facilitating removal of the tape cartridge 2 from the coupling. It is also to be noted that the bend 115 will assist in smoothly lowering the tape cartridge 2 onto the coupling 44 during a loading operation, as well.

It will be understood that various changes in the details, materials and arrangement of parts which have been herein described and illustrated in order to explain the nature of this invention may be made by those skilled in the art within the principle and scope of the invention as expressed in the following claims. Noteworthy in this regard is that the loading/unloading mechanism 1 of the present invention can operate not only in the horizontal position shown in the drawings, but in a vertical position as well.

What is claimed is:

1. An apparatus for loading and unloading a tape cartridge in a tape transport, said tape cartridge including a web of tape disposed on a supply reel and having a free end engaged by a leader block, said leader block having an engagement slot opening to a rear edge of said tape cartridge, and said apparatus comprising:

a loading rack for receiving the rear edge of said tape cartridge along a lateral edge of said loading rack, so that said slot is transversely oriented in said loading rack; and means for engaging the transversely oriented slot of said leader block, for loading and unloading in said tape transport.

2. The apparatus of claim 1 wherein said loading rack is comprised of a pair of rails for receiving said tape cartridge.

3. The apparatus of claim 2 wherein said rails are movable between a standby position for receiving said tape cartridge, and an operative position for engaging operative features of said tape cartridge.

4. The apparatus of claim 3 wherein said apparatus is housed in an enclosure having an aperture for receiving said tape cartridge, and wherein said tape cartridge is locatable between the inside lip of said aperture and stop means associated with said transport apparatus in said standby position.

5. The apparatus of claim 4 wherein said tape cartridge has a bevelled front edge opposite said rear edge, and wherein said aperture includes a chamfer for receiving the bevelled edge of said tape cartridge.

6. The apparatus of claim 3 wherein said rails are movable between said standby position and said operative position responsive to a handle associated with one of said rails.

7. The apparatus of claim 6 wherein said loading rack includes an arm extending between the rails of said loading rack, and over the space which receives the tape cartridge in said standby position, for engaging said tape cartridge and for urging said tape cartridge to the operative position responsive to movement of said handle.

8. The apparatus of claim 7 wherein said arm is spaced from said tape cartridge in the standby position, and engages said tape cartridge responsive to said movement of the handle.

9. The apparatus of claim 7 wherein said tape cartridge is received upon a plurality of pedestals responsive to said movement of the handle, and wherein said pedestals are configured to vertically orient said tape cartridge in said operative position.

10. The apparatus of claim 9 wherein said tape cartridge is received between stop means associated with rear portions of said tape transport, and an enclosure associated with front portions of said tape transport, to longitudinally orient said tape cartridge in said operative position.

11. The apparatus of claim 10 which further comprises alignment means associated with said loading rack for transversely orienting said tape cartridge in said operative position.

12. The apparatus of claim 11 wherein said alignment means comprises a wedge extending from the one of said rails which receives the front edge of said tape cartridge, and along portions of said front edge, and a bevelled member fixedly associated with said tape transport and having an incline in operative association with said wedge.

13. The apparatus of claim 11 wherein said tape cartridge is aligned in said operative position so that supply reel drive means associated with said tape cartridge are aligned with supply reel drive means associated with said tape transport.

14. The apparatus of claim 6 wherein said slot engaging means includes guide pin means for engaging the slot of said leader block, and guide pin locating means for locating said guide pin in said slot when said tape cartridge is located in said standby position.

15. The apparatus of claim 14 wherein said guide pin locating means is a lever, one end of which has a shoulder for engaging a lateral edge of said tape cartridge, and the other end of which has a pin for receiving said guide pin means and for moving said guide pin means toward and away from said slot responsive to engagement of said shoulder.

16. The apparatus of claim 15 wherein movement of the pin of said lever is regulated by a slot in said tape transport and engaging said pin.

17. The apparatus of claim 16 wherein said lever is mounted for vertical movement against the biasing forces of a spring, responsive to contact with said tape cartridge and said loading rack, so that said pin is withdrawn from said guide pin means when said tape cartridge is moved to said operative position.

18. The apparatus of claim 16 wherein said pin is normally biased away from the slot of said leader block, under the influence of a spring.

19. The apparatus of claim 16 wherein an additional lever is engaged at a pivot so that a first end of said additional lever is pivotally connected to the pivot of said lever, and so that a second end of said additional lever includes a protrusion adapted for selective alignment with one of the rails of said loading rack.

20. The apparatus of claim 19 wherein the protrusion of said additional lever is moved away from the rail of said loading rack as the pin of said lever is moved toward the slot of said leader block.

21. The apparatus of claim 6 wherein said tape cartridge further includes a write-protect tab in said rear edge, and said apparatus further comprises means for detecting the presence of said write-protect tab on said tape cartridge.

22. The apparatus of claim 21 wherein said detecting means is a pivotable lever, one end of which includes a protrusion for engaging said write-protect tab, and the other end of which is operatively associated with a sensor for monitoring the position of said protrusion.

23. The apparatus of claim 22 wherein said sensor is an optical interrupter.

24. The apparatus of claim 22 wherein the end of said lever having said protrusion also includes an inclined member extending outwardly and over one of the rails of said loading rack.

25. The apparatus of claim 24 wherein the protrusion of said lever is normally biased toward said write-protect tab, and wherein said inclined member is configured so that said rail retains the protrusion away from said write-protect tab until the loading rack is lowered to said operative position.

26. The apparatus of claim 6 wherein a spring normally biases said loading rack to the standby position.

27. The apparatus of claim 6 which further comprises interlock means in operative association with one of the rails of said loading rack.

28. The apparatus of claim 27 wherein said interlock means comprises:
a gate-pivoted for rotation into and out of alignment with said rail;
a solenoid operatively connected to said gate to pivot said gate responsive to an electrical signal; and
control means for generating said electrical signal.

29. The apparatus of claim 28 wherein said gate is sized to fit between the bottom of said rail in the standby position and the top of said rail in the operative position.

30. The apparatus of claim 28 wherein said gate is normally biased between the positions of said rail.

31. The apparatus of claim 28 wherein said control means generates an electrical signal for retracting said gate when power is applied to said apparatus.

32. The apparatus of claim 28 wherein said control means generates an electrical signal for retracting said gate when said tape cartridge is to be unloaded.

33. The apparatus of claim 28 wherein said control means generates an electrical signal for releasing said gate responsive to a sensor for detecting when said tape cartridge is lowered to said operative position.

34. The apparatus of claim 33 wherein said sensor is an optical interrupter.

35. The apparatus of claim 33 wherein said sensor is operated responsive to a first lever, the end of which is located in alignment with one of the rails of said loading rack, so that said first lever is depressed when said rail is moved to said operative position.

36. The apparatus of claim 35 wherein said gate and said first lever include cooperating inclines so that said first lever is maintained in said depressed condition when the loading rack is in said operative position.

37. The apparatus of claim 35 wherein said sensor is operated responsive to a second lever, the end of which is located in alignment with said tape cartridge, so that said second lever is depressed when said tape cartridge is moved to said operative position.

38. The apparatus of claim 37 wherein said sensor is operated responsive to simultaneous depression of said first and second levers.

39. The apparatus of claim 6 wherein the supply reel of said tape cartridge is engaged by a geared, magnetic coupling in said operative position, and wherein the rails of said loading rack include a bend for assisting in removal of the tape cartridge from said geared, magnetic coupling when said loading rack is moved from said operative position to said standby position.

40. The apparatus of claim 1 wherein said apparatus is contained within a 5¼ inch form factor.

41. An apparatus for loading and unloading a tape cartridge in a tape transport, said tape cartridge including a web of tape disposed on a supply reel and having a free end engaged by a leader block, said leader block having an engagement slot opening to a rear edge of said tape cartridge, and said apparatus comprising:
 a loading rack for longitudinally receiving said tape cartridge with the rear edge of said tape cartridge positioned along a lateral edge of said loading rack, so that said slot is transversely oriented in said loading rack; and
 means for engaging the transversely oriented slot of said leader block, for loading and unloading in said tape transport.

42. The apparatus of claim 41 wherein said loading rack is movable between a standby position for longitudinally receiving said tape cartridge, and an operative position for engaging operative features of said tape cartridge which are positioned along the lateral edge of said loading rack.

43. The apparatus of claim 42 wherein said operative feature is the slot of said leader block, and wherein said slot engaging means includes guide pin means for engaging the slot of said leader block and guide pin locating means for locating said guide pin in said transversely oriented slot when said tape cartridge is longitudinally received in said standby position.

44. The apparatus of claim 42 wherein said operative feature is a write-protect tab on the rear edge of said tape cartridge, and said apparatus further comprises means for detecting the presence of said write-protect tab on said tape cartridge, said detecting means being positioned along the lateral edge of said loading rack.

45. An apparatus for loading and unloading a tape cartridge in a tape transport, said tape cartridge including a web of tape disposed on a supply reel and having a free end engaged by a leader block, said leader block having an engagement slot opening to a rear edge of said tape cartridge, and said apparatus comprising:
 a loading rack for receiving the rear edge of said tape cartridge along a lateral edge of said loading rack, so that said slot is transversely oriented in said loading rack;
 means for engaging the transversely oriented slot of said leader block, for loading and unloading in said tape transport;
 means for moving said loading rack between a standby position for receiving said tape cartridge, and an operative position for engaging operative features of said tape cartridge; and
 means for vertically orienting said tape cartridge in said operative position, and for longitudinally and transversely orienting said tape cartridge so that supply reel drive means associated with said tape cartridge are aligned with supply reel drive means associated with said tape transport.

* * * * *